Sept. 3, 1957　　　A. J. ROSENBERGER　　　2,804,877
PILOT CONTROLLED FLUID PRESSURE REGULATOR
Filed Aug. 1, 1955
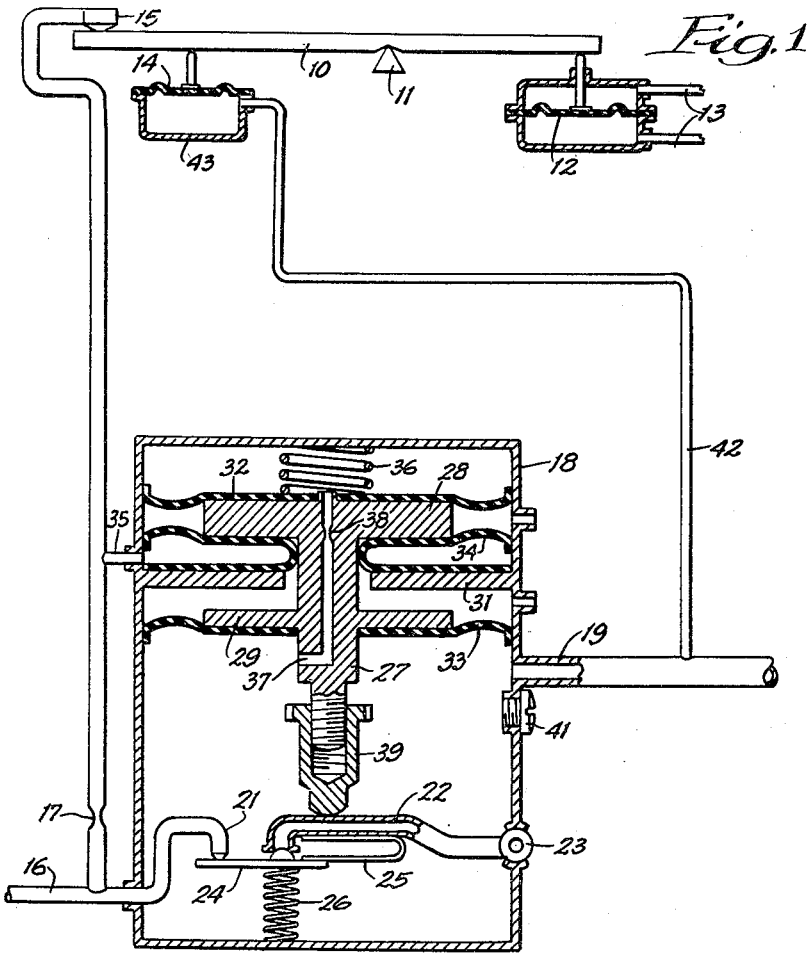
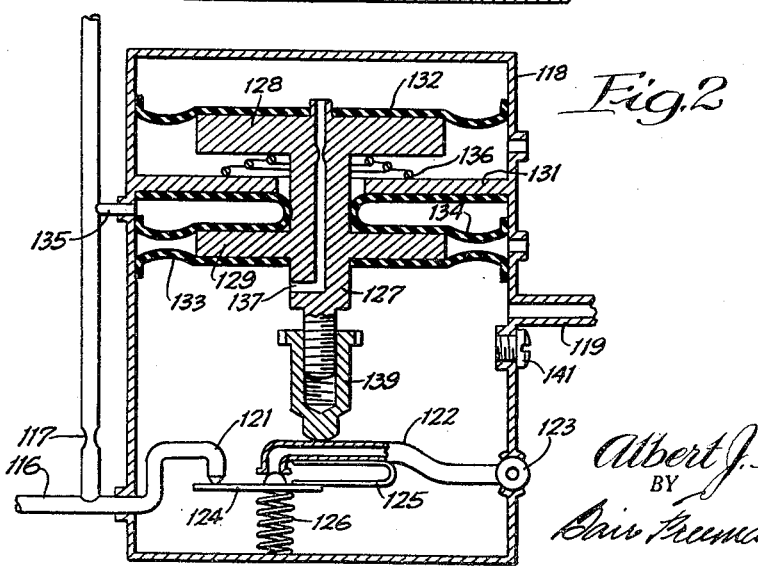
INVENTOR:
Albert J. Rosenberger,
BY
ATTORNEYS.

United States Patent Office 2,804,877
Patented Sept. 3, 1957

2,804,877

PILOT CONTROLLED FLUID PRESSURE REGULATOR

Albert J. Rosenberger, Chicago, Ill., assignor, by mesne assignments, to Republic Flow Meters Company, Chicago, Ill., a corporation of Delaware Application August 1, 1955, Serial No. 525,518

5 Claims. (Cl. 137—84)

This invention relates to a pilot controlled fluid pressure regulator in which the pilot pressure returns to the same neutral value (whenever a steady state condition is being maintained) irrespective of the required output pressure. Or in other words it can be described as a relay of infinite gain.

Instruments and controllers that convert measured functions into pneumatic pressures for transmission purposes or to initiate a control action conventionally have a valve of the nozzle and baffle type. These valves have a very limited fluid capacity and therefore the slight displacement of the component parts or varying reaction force associated with pressure changes or both, may impair the accuracy of an instrument or cause the set point of a controller to vary.

Therefore it is necessary to introduce a relay valve of larger fluid capacity to provide faster transmission speeds and to minimize the amount of pressure change required at the nozzle valve.

Heretofore these relays have contained valves of the throttling supply and waste type which are wasteful of air and consequently limited in their practical size. In addition there is a proportional relationship between the output of this relay and the nozzle valve pressure which is a necessary characteristic for stability. This latter condition reduces the error due to the reaction pressure on the baffle of the nozzle valve but does not remove it. Another type of relay sometimes used does not have the throttling type valve but has a definite proportional relation between the pilot pressure and the output pressure.

The error in an instrument associated with changes in nozzle pressure is in the nature of a slightly non-linear calibration.

It is therefore one of the objects of the present invention to provide a pilot controlled fluid pressure regulator which may have any desired capacity for speed of response without adversely affecting linearity.

Another object is to provide a fluid pressure regulator in which the pilot control pressure is returned to a constant value regardless of the required output pressure. In other words, the regulator of the present invention may be said to have infinite gain.

A further object is to provide a fluid pressure regulator in which the response may change in the same direction as or inversely to the pilot control pressure.

A still further object is to provide a regulator which is easily adjustable to produce linearity of response in the regulator itself or to produce a desired degree of non-linearity to balance non-linearity in other parts of the system.

The above and other objects and features of the invention will be more readily apparent from the following description when read in connection with the accompanying drawing, in which:

Figure 1 is a diagrammatic view with parts in section of a pilot controlled fluid pressure regulator system embodying the invention; and Figure 2 is a section of the regulator itself modified to produce changes in the same direction as the pilot pressure.

The regulator, as shown in Figure 1, is adapted to be controlled by pilot pressure from a transmitter which is illustrated diagrammatically as including a balance beam 10 pivoted at 11. A flexible diaphragm 12 may be connected through conduits 13 to sources of pressure representative of a condition to be measured such, for example, as flow, pressure, temperature, or the like. The diaphragm urges the beam in one direction in response to the value of the condition.

The beam is urged in the other direction by a second diaphragm 14 and the end of the beam moves toward or away from a nozzle 15 lying adjacent to the end of the beam to be variably restricted thereby. The nozzle is supplied with fluid under pressure from any desired source through a conduit 16 and a restriction 17 to produce automatically a pressure which is utilized as a pilot pressure to operate the regulator.

The pressure developed in the nozzle 15 is adapted to control the pressure responsive regulator of the present invention which will produce in turn an output pressure which is applied to diaphragm 14 to balance the force of diaphragm 12. The fluid pressure relay, as shown, comprises a casing 18 having an outlet connection 19 thereto which may be connected to a remotely located gauge or controller. The regulator is supplied with fluid under pressure from any desired source, such as the source 16, and the supply may be relatively unrestricted so that the regulator will have an extremely large capacity to be fast acting. As shown, the fluid supply is brought into the casing 18 through a nozzle 21 which opens into the casing in the same portion thereof as the outlet connection 19. Fluid is adapted to be exhausted from the casing to reduce pressure therein through an exhaust conduit 22 pivotally mounted at 23 in the casing wall and vented to the exterior of the casing through the pivot. The conduit 22 terminates in an exhaust port adjacent to and facing in the same direction as the inlet port of the nozzle 21.

The inlet and exhaust ports are adapted to be controlled by a common valve member 24 which is pivotally connected to the conduit 22 through a hairpin spring 25 which tends to bias the member away from the exhaust port. A spring 26 acting on the valve member 24 urges it upward toward the inlet and exhaust ports. In the normal condition of the exhaust conduit, as shown, the valve member 24 closes both the inlet and exhaust ports so that fluid will neither be admitted to nor discharged from the relay casing. If the valve member 22 moves upward, the exhaust port will be opened while the inlet port remains closed to reduce the relay pressure while if the exhaust conduit 22 is moved downward, the exhaust port will remain closed and the inlet port will be opened to increase the output pressure.

The exhaust conduit 22 is controlled by a movable operating member 27 which is movable vertically in the relay housing and is operatively engageable with the exhaust conduit to move it downward, the spring 25 acting to move the exhaust conduit upward to maintain it in contact with the operating member. The operating member is formed with a pair of spaced flanges 28 and 29 lying on opposite sides of fixed annular flange 31 in the relay housing. Diaphragms 32 and 33 are secured at their peripheries to the interior of the housing and fit against the flanges 28 and 29, respectively, to seal the operating member in the housing.

An operating diaphragm in the form of an annular tube or double diaphragm structure 34 is arranged between the annular flange 31 and one of the flanges 28 or 29. As shown in Figure 1, the diaphragm 34 lies between the upper surface of the flange 31 and the lower surface of the flange 28 so that pressure acting on the diaphragm will tend to raise the operating member to produce an inverse relay action. The interior of the diaphragm 34 is connected through a conduit 35 with the nozzle 15 so that the pressure produced by the transmitter will act on the diaphragm 34. The force of the diaphragm 34 is balanced by a spring 36 acting on the operating member.

The lower sealing diaphragm 33 is exposed directly to the pressure in the outlet connection 19 and this same pressure is transmitted to the upper part of the relay housing to act on the diaphragm 32. For this purpose, the operating member 27 is formed with a bore 37 therethrough, which may be restricted, as indicated at 38, to delay the rebalancing effect on the diaphragm 32 thereby to provide an anticipating effect. With diaphragms 32 and 33 of exactly equal area they will balance each other irrespective of the output pressure and therefore under steady state conditions the pressure on diaphragm 34 will be the same for any output pressure.

The pressure in the outlet connection is utilized to rebalance the beam 10 of the transmitter. For this purpose the connection 19 is connected through a conduit 42 to a housing 43 enclosing the lower surface of the diaphragm 14. The beam 10 will, therefore, be balanced when the relay output pressure in the outlet connection 19 is proportional to the value of the condition as sensed by the diaphragm 12 and the pressure at the nozzle 15 will always be at the same value when the system is in a steady state condition regardless of the values of the other pressures.

Although the effective diameter of a diaphragm is considered to be the mean diameter of the slack portion this is true only with the diaphragm in one position of its free movement. As the diaphragm is moved in the direction of the pressure acting on it the effective diameter decreases and as it is moved in the opposite direction the effective diameter increases. Therefore movement of an assembly of two diaphragms that exert opposing force causes the area of one to increase while the other decreases.

If the two diaphragms 32 and 33 are precisely the same effective area when the operating member is in a position to close both the inlet and outlet ports, the relay will require a constant pilot pressure value to maintain steady state conditions with any output pressure.

To adjust the relative effective areas of these two diaphragms the connection between the operating member 27 and the exhaust conduit 22 is made adjustable. For this purpose, the lower end of the operating member 27 is in the form of a threaded stem and a cup shaped element 39 is threaded into this stem. The cup shaped element 39 can be turned to adjust it by reaching through an opening in the housing normally closed by a threaded plug 41 by a screw driver, or the like, and turning the element 39. If a slight variation in pilot pressure with output pressure is desired to compensate some non-linearity of other components the member 39 can be adjusted to make the diaphragms unequal.

In operation, assume that a change occurs in the condition which increases the upward force exerted by the diaphragm 12. This will rock the beam 10 counter-clockwise to open the nozzle 15 and decrease the pilot pressure acting on the diaphragm 34.

Decrease in pressure on the diaphrgam 34 will lower the operating member 27, forcing the exhaust conduit 22 down to open the supply port 21. Pressure will, therefore, be increased from the regulator to be transmitted through the output connection 19. At the same time the pressure above the diaphragm 32 will slowly increase to that at the outlet connection due to the restriction 38 so that the diaphragms 32 and 33 will again balance each other. The restriction 38 is designed to permit rebalancing at a rate that will produce greatest speed with stability.

It will be noted that in the steady state condition the pressure at the nozzle 15 is always the same, unless the relay is intentionally adjusted to compensate for an inherent non-linearity in the instrument or controller to which conduit 19 is connected, so that inaccuracies due to varying nozzle pressure are eliminated. However, the regulator output pressure in conduit 19 will always be proportional to the existing value of the condition as sensed by the diaphragm 12.

When it is desired to have the regulator output pressure vary in a direction opposite to the pilot pressure, the relay structure may be modified, as shown in Figure 2, wherein parts identical with corresponding parts in Figure 1 are indicated by the same reference numerals, plus 100. In this construction, the spring 136 acts between the upper surface of the flange 134 and the lower surface of the flange 128 to urge the operating member 127 upward. The diaphragm 134 acts between the lower surface of the flange 131 and the upper surface of the flange 129. Therefore, upon an increase in the pilot pressure acting on the diaphragm 134 as a result of a decrease in the pressure sensed by diaphragm 12, the operating member 127 will be pressed downward to move the exhaust conduit 122 downward thereby to move the valve member 124 away from the inlet port on the nozzle 121 so that fluid under pressure may enter the regulator to increase the output pressure. Except for the fact that in this construction the output pressure changes in a direction opposite to the pilot pressure, the operation is identical to that of Figure 1.

While two embodiments of the invention have been shown and described herein, it will be understood that they are illustrative only and not to be taken as a definition of the scope of the invention, reference being had for this purpose to the appended claims.

What is claimed is:

1. A fluid pressure regulator comprising a hollow casing having an outlet connection therefrom, an inlet conduit extending into the casing and terminating in a nozzle, an exhaust conduit extending into the casing and terminating in a nozzle, a movable valve member normally closing both of the nozzles, an operating member in the casing movable in one direction to unseat the valve member from one of the nozzles and in the other direction to unseat the valve member from the other nozzle, a pair of spaced flexible diaphragms sealing the operating member in the casing, the operating member having a restricted passage therethrough to slowly equalize the pressures acting on the diaphragms, a spring urging the operating member in one direction, and a pressure responsive element between the diaphragms acting on the operating member and urging it in the other direction, the operating member being freely movable solely in response to the difference in forces exerted thereon by the spring and pressure responsive element.

2. A fluid pressure regulator comprising a hollow casing having an outlet connection therefrom, an inlet conduit extending into the casing and terminating in a nozzle, an exhaust conduit extending into the casing and terminating in a nozzle, a movable valve member normally closing both of the nozzles, an operating member in the casing movable in one direction to unseat the valve member from one of the nozzles and in the other direction to unseat the valve member from the other nozzle, a pair of spaced flexible diaphragms sealing the operating member in the casing, the operating member having a restricted passage therethrough to slowly equalize the pressures acting on the diaphragms, a spring urging the operating member in one direction, a pressure responsive element between the diaphragms acting on the operating member and urging it in the other direction, a bleed nozzle communicating with said element and with a source of fluid pressure, a balance member movable toward and away from the bleed nozzle to produce a regulated pressure in the nozzle, means responsive to a condition to be measured to urge the balance member in one direction, and means responsive to the pressure in the outlet connection to urge the balance member in the other direction, the operating member being freely movable solely in response to the difference in forces exerted thereon by the spring and pressure responsive element.

3. A fluid pressure relay comprising a hollow casing having an outlet connection therefrom, an inlet conduit extending into the casing and terminating in a nozzle, an exhaust conduit extending into the casing and terminating in a nozzle, a valve member movably carried by one of the nozzles and resiliently biased away from the nozzles, a spring urging the valve member toward said one nozzle, the nozzles being movable from a normal position in which the valve member closes both nozzles in one direction to open one nozzle and in the other direction to open the other nozzle, an operating member in the casing engageable with said one of the nozzles to move it, a pair of spaced flexible diaphragms sealing the operating member in the casing, the operating member having a restricted passage therethrough to slowly equalize the pressures acting on the diaphragms and in communication with the outlet connection, a spring urging the operating member in one direction and a pressure responsive element between the diaphragms acting on the operating member to move it in the other direction, the operating member being freely movable solely in response to the difference in forces exerted thereon by the spring and pressure responsive element.

4. A fluid pressure relay comprising a hollow casing having an outlet connection therefrom, an inlet conduit extending into the casing and terminating in a nozzle, an exhaust conduit extending into the casing and terminating in a nozzle, a valve member movably carried by one of the nozzles and resiliently biased away from said nozzles, a spring urging the valve member toward the nozzles, said one nozzle being movable from a normal position in which the valve member closes both nozzles in one direction to open one nozzle and in the other direction to open the other nozzle, an operating member in the casing engageable with said one of the nozzles to move it, a pair of spaced flexible diaphragms sealing the operating member in the casing, the operating member having a restricted passage therethrough to slowly equalize the pressures acting on the diaphragms and in communication with the outlet connection, a spring urging the operating member in one direction, a pressure responsive element between the diaphragms acting on the operating member to move it in the other direction, the operating member being freely movable solely in response to the difference in forces exerted thereon by the spring and pressure responsive element, a bleed nozzle communicating with the pressure responsive element, a balance member movable toward and away from the bleed nozzle to regulate the pressure therein, means responsive to a condition to be measured urging the balance member in one direction, and means responsive to the pressure in the outlet connection to urge the balance member in the other direction.

5. A fluid pressure relay comprising a hollow casing having an outlet connection therefrom, an inlet conduit extending into the casing and terminating in a nozzle, an exhaust conduit extending into the casing and terminating in a nozzle, a valve member movably carried by one of the nozzles and resiliently biased away from said one nozzle and toward the other nozzle, a spring urging the valve member toward said one nozzle, said one nozzle being movable from a normal position in which the valve member closes both nozzles in one direction to open one nozzle and in the other direction to open the other nozzle, an operating member in the casing engageable with said one of the nozzles to move it, a pressure responsive element operatively connected to the operating member to move it, the operating member being freely movable solely in response to changes in force exerted thereon by the pressure responsive element, a pair of spaced flexible diaphragms sealing the operating member in the casing, the operating member having a restricted passage therethrough to slowly equalize the pressures acting on the diaphragms, one of the diaphragms being in open communication with the outlet connection, and adjustable means to adjust the relative positions of the operating member and said one of the nozzles.

References Cited in the file of this patent
UNITED STATES PATENTS

| | | |
|---|---|---|
| 2,441,405 | Fitch | May 11, 1948 |
| 2,520,547 | Hughes | Aug. 29, 1950 |
| 2,618,155 | Conner et al. | Nov. 18, 1952 |
| 2,724,398 | Higgins et al. | Nov. 22, 1955 |
| 2,725,068 | Howe | Nov. 29, 1955 |
| 2,729,223 | Rosenberger | Jan. 3, 1956 |